US010195469B2

(12) United States Patent
Smith et al.

(10) Patent No.: US 10,195,469 B2
(45) Date of Patent: Feb. 5, 2019

(54) FIRE SUPPRESSION CONTROL SYSTEM FOR AN AIRCRAFT

(71) Applicant: Kidde Graviner Limited, Slough, Berkshire (GB)

(72) Inventors: Stuart M. Smith, Colnbrook (GB); Paul A. Rennie, Bracknell (GB); Josephine G. Gatsonides, Dunstable (GB)

(73) Assignee: KIDDE GRAVINER LIMITED, Colnbrook, Slough, Berkshire (GB)

( * ) Notice: Subject to any disclaimer, the term of this patent is extended or adjusted under 35 U.S.C. 154(b) by 0 days.

(21) Appl. No.: 15/209,960

(22) Filed: Jul. 14, 2016

(65) Prior Publication Data
US 2017/0014656 A1    Jan. 19, 2017

(30) Foreign Application Priority Data

Jul. 17, 2015 (GB) .................................. 1512502.4

(51) Int. Cl.
*A62C 3/08* (2006.01)
*A62C 35/68* (2006.01)
(Continued)

(52) U.S. Cl.
CPC ................ *A62C 3/08* (2013.01); *A62C 35/68* (2013.01); *A62C 37/36* (2013.01); *B64C 19/00* (2013.01);
(Continued)

(58) Field of Classification Search
CPC ........... A62C 3/08; A62C 37/00; A62C 37/04; A62C 37/36; A62C 37/38; A62C 37/40;
(Continued)

(56) References Cited

U.S. PATENT DOCUMENTS 3,592,270 A    7/1971  Livingston et al.
4,655,078 A *  4/1987  Johnson ................. A62C 37/50
                                                              137/559

(Continued)

FOREIGN PATENT DOCUMENTS

CN    203577214 U    5/2014
CN    104368113 A    2/2015
(Continued)

OTHER PUBLICATIONS

GB Search Report for Application No. 1512502.4 dated Jul. 15, 2016; 4 Pages.

*Primary Examiner* — Alexander Valvis
(74) *Attorney, Agent, or Firm* — Cantor Colburn LLP

(57) ABSTRACT

A directional valve for a fire suppression system comprises a valve member for controlling the discharge of fire suppression agent. The valve member comprises: a blocking portion to provide a closed setting for the fire suppression agent; a first orifice to provide a fully open setting for the fire suppression agent; and a second orifice to provide a restricted opening setting in which discharge of fire suppression agent is restricted. The valve member is configured so that during activation of the directional valve from a closed setting, the first orifice follows the blocking portion and precedes the second orifice in order to provide a fully open setting followed by a restricted opening setting.

4 Claims, 3 Drawing Sheets

(51) Int. Cl.
  *A62C 37/36* (2006.01)
  *B64C 19/00* (2006.01)
  *B64D 45/00* (2006.01)
  *A62C 99/00* (2010.01)

(52) U.S. Cl.
  CPC .......... B64D 45/00 (2013.01); *A62C 99/0018* (2013.01); *B64D 2045/009* (2013.01)

(58) Field of Classification Search
  CPC ..... A62C 37/44; A62C 35/68; A62C 99/0018; B64C 19/00; B64C 19/02; B64D 2045/005; B64D 2045/009
  See application file for complete search history.

(56) References Cited

U.S. PATENT DOCUMENTS

| | | | |
|---|---|---|---|
| 6,053,256 A | 4/2000 | Lu | |
| 7,510,022 B2 | 3/2009 | Lazzarini | |
| 7,849,931 B2 | 12/2010 | Ng | |
| 7,886,836 B2 | 2/2011 | Haaland et al. | |
| 8,678,101 B2 | 3/2014 | Gatsonides et al. | |
| 8,733,463 B2 * | 5/2014 | Meier | A62C 99/0018 169/46 |
| 8,925,642 B2 | 1/2015 | Meier et al. | |
| 9,033,061 B2 | 5/2015 | Chattaway et al. | |
| 2003/0084942 A1 | 5/2003 | McHugh | |
| 2010/0236796 A1 * | 9/2010 | Chattaway | A62C 37/44 169/46 |
| 2011/0048747 A1 | 3/2011 | Gastonides et al. | |
| 2011/0186312 A1 * | 8/2011 | Gatsonides | A62C 3/07 169/46 |
| 2011/0308823 A1 | 12/2011 | Seebaluck et al. | |
| 2012/0031634 A1 | 2/2012 | Lewinski et al. | |
| 2012/0168184 A1 | 7/2012 | Enk, Sr. | |
| 2014/0202718 A1 | 7/2014 | Meis et al. | |

FOREIGN PATENT DOCUMENTS

| | | |
|---|---|---|
| DE | 102009042370 A1 | 3/2011 |
| EP | 2233175 A1 | 9/2010 |
| EP | 2353658 A1 | 8/2011 |
| EP | 2404645 A2 | 1/2012 |
| EP | 2813266 A2 | 12/2014 |
| WO | 9904860 A1 | 2/1999 |

* cited by examiner

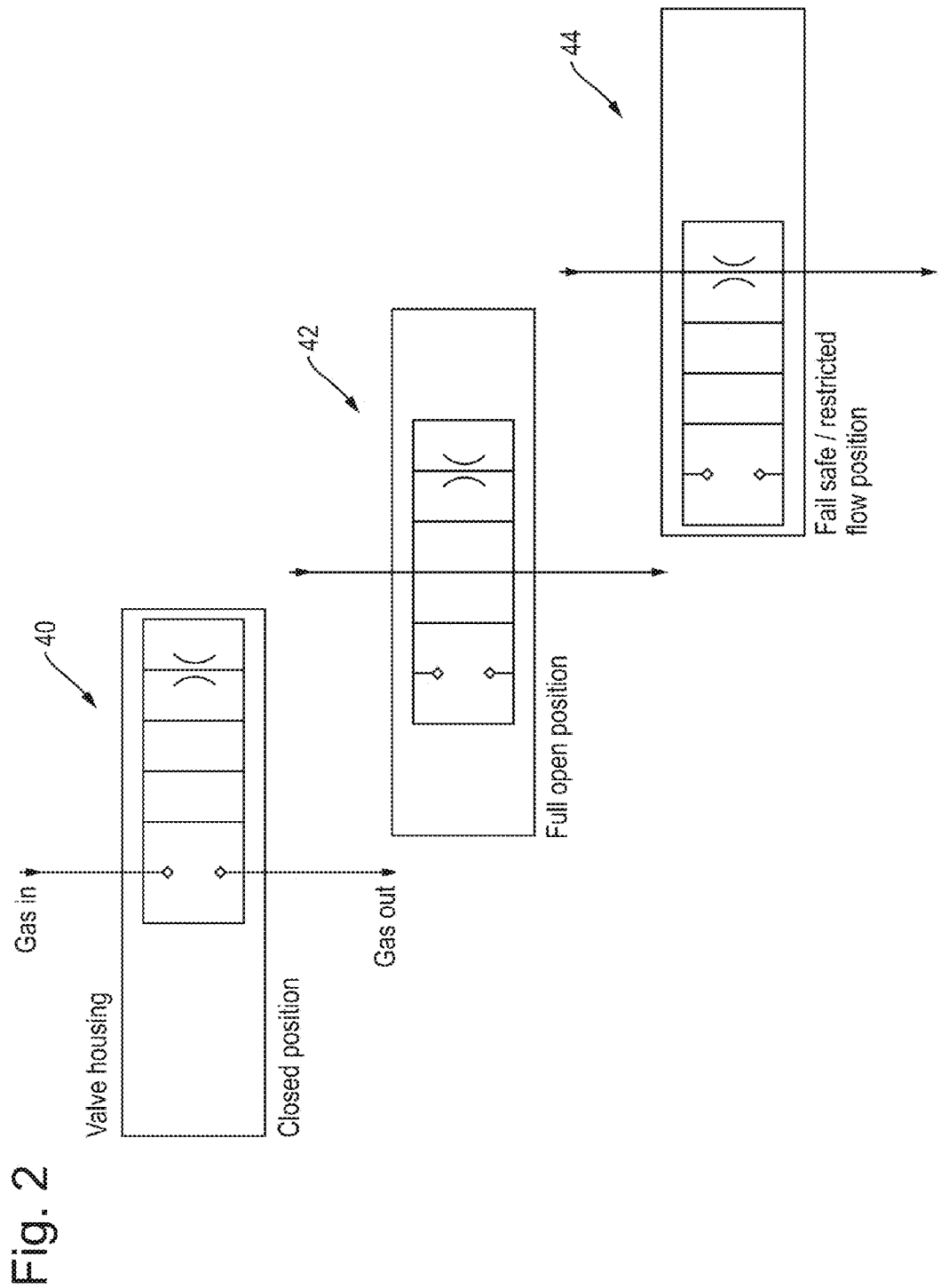

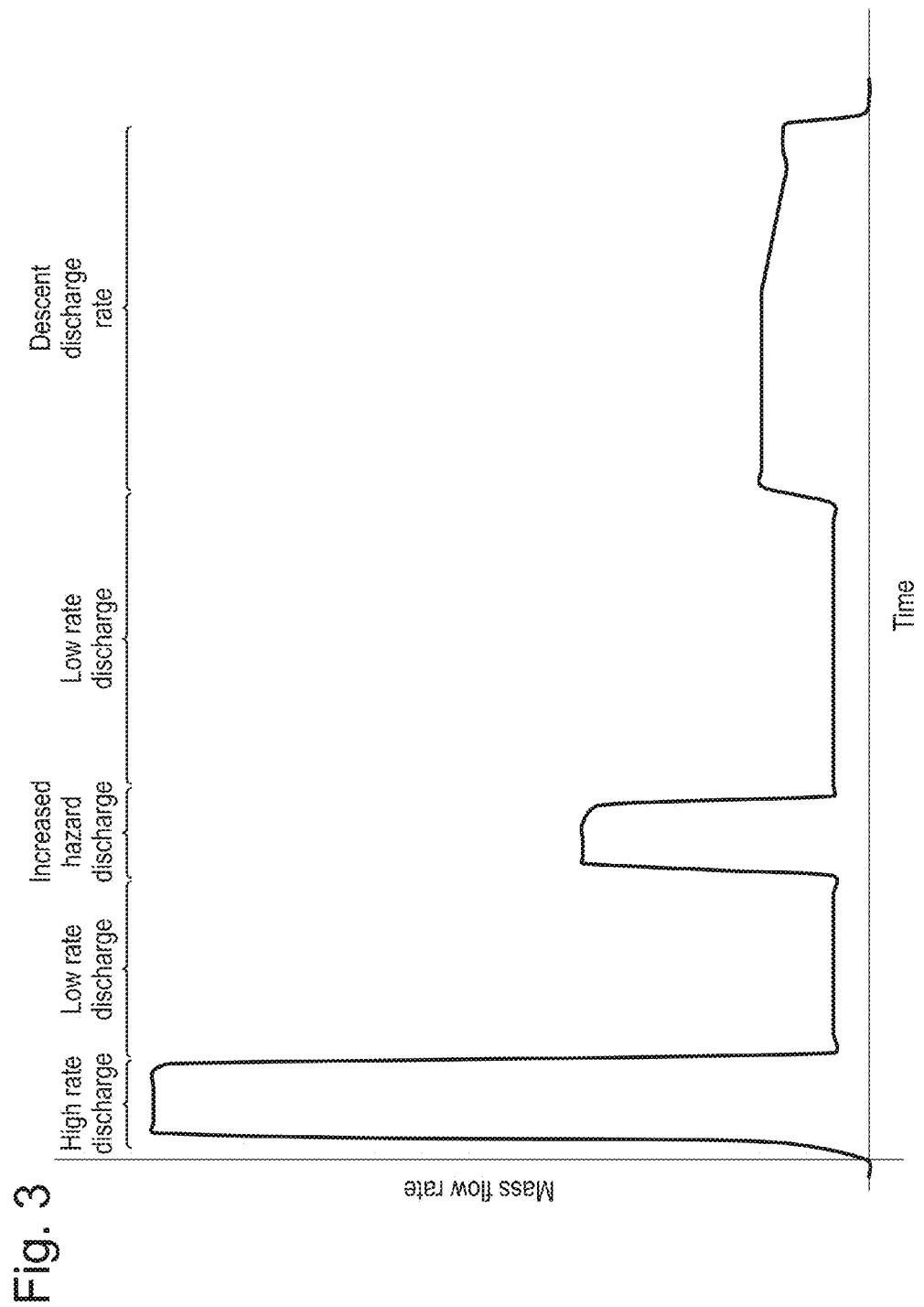

FIRE SUPPRESSION CONTROL SYSTEM FOR AN AIRCRAFT

FOREIGN PRIORITY

This application claims priority to United Kingdom Patent Application No. 1512502.4 filed Jul. 17, 2015, the entire contents of which is incorporated herein by reference.

TECHNICAL FIELD

The present disclosure relates to fire suppression on board aircraft.

BACKGROUND

Fires on board aircraft can be extremely damaging, whether to the goods in a cargo hold, the passengers on the aircraft or to the structure of the aircraft itself. It is known in the art to provide aircraft with fire suppression systems, in order to quickly extinguish fires before they can cause serious harm. However, there are a number of problems which make suppressing a fire on board an aircraft quite difficult.

In conventional land-based fire suppression systems, the fire suppression agent may act to starve the fire of oxygen. If a fire has less than 10-12% of oxygen in the surrounding air, it will not restart. However, in aircraft, the various enclosures are not completely airtight and ventilation is provided by a central ventilation system, which circulates air throughout the various enclosures of the aircraft. Some of the fire suppression agent discharged would leak out of the enclosure containing the fire, thereby increasing the proportion of oxygen in the air and possibly allowing a fire to restart.

Additionally, during the descent of an aircraft, the external ambient air and cabin pressures increase, and with that, the proportion of oxygen in the aircraft increases. Thus even if the proportion of oxygen in a protected enclosure is initially reduced below a certain level, over time, the proportion will slowly increase again, thereby undoing the work of the fire suppression agent and potentially causing the fire not to be put out, or to restart. This situation presents a difficulty in controlling the environment around the fire.

The current aircraft fire suppression systems known in the art initially introduce an initial large quantity of fire suppression agent into the enclosure. In order to then avoid the above mentioned problems, these systems then continue to discharge a slow flow of the fire suppression agent, in order to make up for the losses in the aircraft and the addition of further oxygen.

Regarding the choice of fire suppression agent, many current systems make use of halon which may, for example, comprise halon 1211, which is bromochlorodifluoromethane (CF2ClBr), or halon 1301 which is bromotrifluoromethane (CBrF3), or a mixture of the two. However, in recent years, production of halon has become illegal due to environmental concerns of ozone depletion and thus there is a limited supply available for use as a fire suppression agent. Various other fire suppression agents have been tested, including inert gas fire suppression agents. These may include nitrogen, argon, helium, FM 200 or carbon dioxide. There is also the possibility of using recovered nitrogen and carbon dioxide. It has been found that a smaller quantity of halon is required to put out the same size fire than inert gas. Since a substantially greater volume of inert gas needs to carried than that of halon, a greater weight is carried for the same suppressing capability and results in more aircraft fuel being burnt to carry the fire suppression agent. Consequently, for current systems, the environmental impact of the additional greenhouse gases is comparable to the use of halon and so halon is still used in aircraft fire suppression systems, with some systems using a combination of halon and halon-replacement systems.

One of the disadvantages of current aircraft fire suppression systems is that they do not take into consideration the requirements of each enclosure when a fire hazard is detected in multiple enclosures. Thus there exists in the art a need for an improved aircraft fire suppression system.

It would be desirable to improve the efficiency of inert gas based fire suppression systems so that the weight penalty compared to carrying halon could be reduced and the environmental effects of carrying and using the inert gas could have at least similar, if not less of an environmental impact.

Some improvements in this regard are taught in EP-A-2813266 and EP-A-2353658, the entire contents of which are incorporated herein by reference.

Moreover, there is a need in the art to appreciate that fires may occur in multiple enclosures.

SUMMARY OF THE DISCLOSURE

According to a first aspect of the disclosure, there is provided a directional valve for a fire suppression system, comprising a valve member for controlling the discharge of fire suppression agent, wherein the valve member comprises: a blocking portion to provide a closed setting for the fire suppression agent; a first orifice to provide a fully open setting for the fire suppression agent; and a second orifice to provide a restricted opening setting in which flow of fire suppression agent is restricted, wherein the valve member is configured so that during opening of the directional valve from a closed setting, the first orifice follows the blocking portion and precedes the second orifice in order to provide a fully open setting followed by a restricted opening setting.

The valve member may comprise a plate or a rotational element which has the blocking portion, the first orifice and the second orifice sequentially positioned corresponding to the different settings. The valve member may be biased such that in the event of loss of power, the valve member may move to a restricted opening setting in the case where it has already been unlocked.

The disclosure also relates to a fire suppression system comprising the directional valve. For example, there is provided a fire suppression system for an aircraft having a plurality of enclosures, the fire suppression system comprising a plurality of directional valves as described above, each provided in an agent discharge line to an enclosure for controlling the discharge of fire suppression agent to the enclosure.

The valve member may comprise a plate or a rotational element with sequentially positioned blocking portion, first orifice and second orifice. The following are non-limiting examples of the valve member configuration. The valve member may be in the form of a rotating plate with various sized orifices. Alternatively, the valve member may comprise a ball valve having multiple bores of various sizes in the ball, and/or a multi-way ball valve in which all exit ports have different orifice sizes, and all exit ports are collectively connected to the same downstream network. Alternatively, the valve member may comprise a sliding spool valve. Alternatively, the valve member may comprise a sliding plate valve. The sliding plate may slide in a linear fashion.

In some embodiments the fire suppression system further comprises a control unit that sends a warning signal to the cockpit. A manual control may be provided in the cockpit to open the directional valves.

In some embodiments the control unit is configured so that if a first fire in a first enclosure is detected, it regulates the pressure of the fire suppression agent reaching the directional valve so that a high rate discharge of fire suppression agent is provided to the first enclosure initially, followed by a low rate discharge of fire suppression agent once sensors indicate that the fire is extinguished or sufficiently subdued.

The size of the second orifice may be sized to produce a level of discharge of fire suppression agent when subjected to a high-rate-discharge pressure that corresponds to a low rate discharge using the first orifice under a low-rate-discharge pressure.

In some embodiments the control unit is configured so that if a second fire is detected in a second enclosure and the first enclosure is being subjected to a low rate discharge of fire suppression agent, then the control unit: permits further actuation of the directional valve for the first enclosure to select the second orifice; and regulates the pressure of the fire suppression agent reaching the directional valves of the first and second enclosures to a high-rate-discharge pressure in order to produce a high rate discharge of fire suppression agent in the second enclosure while the discharge rate in the first enclosure is restricted by the second orifice of the directional valve for the first enclosure.

By providing each directional valve with multiple orifices, more control is given over the relative amount of fire suppression agent being discharged from the manifold to each enclosure. The benefits offered by such a system would, for example, be found in the case where only a low rate discharge of fire suppression agent is needed for a first enclosure, but a high rate discharge is needed for a second enclosure. In that case, the valve settings for the directional valves for the second and first enclosures can be selected to be fully open and restricted opening respectively, such that a high rate discharge is effected in the second enclosure and a low rate discharge is effected in the first enclosure. This avoids the wastage of fire suppression agent due to a high rate discharge being applied to both enclosures where only a low rate discharge is necessary in the first enclosure.

The system may further comprise a manifold which is in fluid communication with the directional valves where fire suppression agent is collected from a plurality of fire suppression agent bottles and regulated to be at a high-rate-discharge pressure or a low-rate-discharge pressure before flowing into one or more selected enclosures (i.e. protected enclosures) with opened directional valves.

The size of the second orifice can be selected to produce at least a sustained low rate discharge of fire suppression agent to the largest cargo enclosure.

In some arrangements, the valve member for the directional valve may be "variable" in the sense that it can be replaced easily with an alternative directional valve member having a second orifice of a different size. In this way, the size of the second orifice can be selected to provide a restricted opening setting that is more clearly matched to the requirements of the protected enclosure. For example, a smaller second orifice can be selected where the enclosure is smaller than the largest cargo enclosure, and/or where the maintenance of fire due to the presence of combustible materials is less.

It may be appropriate to provide the valve member with a third or further orifice. For example, the valve member may comprise a blocking portion, a first orifice to provide a fully open setting, a second orifice to provide a restricted opening setting suitable for providing a low rate discharge in the largest cargo enclosure when receiving fire suppression agent at a high-rate-discharge pressure, and a third orifice to provide a restricted opening setting suitable for providing a low rate discharge in some other (e.g. smaller) enclosure when receiving fire suppression agent at a high-rate-discharge pressure. In this way, one directional valve may be produced which is suitable for the different agent discharge lines. The directional valve or an actuator therefor may be modified to ensure that only the orifice for the restricted opening setting of the right size can be selected for a given enclosure.

The fire suppression system may be arranged to direct fire suppression agent to one or more cargo enclosures as well as to one or more of an electronics bay, an APU compartment or a fuel tank. This may allow for some redundancy in the fire suppression provided for such an electronics bay, an APU compartment or a fuel tank.

According to a second aspect of the disclosure, there is provided a method of controlling fire suppression in a plurality of enclosures of an aircraft comprising: providing for each enclosure a directional valve having multiple settings to control the discharge of fire suppression agent to the enclosure; on detection of a first fire in a first enclosure, opening the directional valve for the first enclosure from an initial closed setting, where a blocking portion of a valve member blocks the discharge of fire suppression agent, to a fully open setting where a first orifice in the valve member allows the discharge of fire suppression agent therethrough; and when conditions demand, further actuating the directional valve for the first enclosure from the fully open setting to a restricted opening setting, in which a second orifice in the valve member is selected that restricts the discharge of fire suppression agent to the first enclosure.

The method may comprise moving a valve member in the form a plate or a rotational element which has the blocking portion, the first orifice and the second orifice in a sequence corresponding to the different settings.

The valve member may comprise a plate or a rotational element with sequentially positioned blocking portion, first orifice and second orifice. The following are non-limiting examples of the valve member configuration. The valve member may be in the form of a rotating plate with various sized orifices. Alternatively, the valve member may comprise a ball valve having multiple bores of various sizes in the ball, and/or a multi-way ball valve in which all exit ports have different orifice sizes, and all exit ports are collectively connected to the same downstream network. Alternatively, the valve member may comprise a sliding spool valve. Alternatively, the valve member may comprise a sliding plate valve. The sliding plate valve may slide in a linear fashion.

In some embodiments, the directional valve for the first enclosure is moved to a restricted opening setting in the case where a second fire in a second enclosure has been detected and a low rate discharge is required for the first enclosure. In such cases, the directional valve for the second enclosure may be opened from an initial closed setting, where a blocking portion of a valve member for that directional valve blocks the discharge of fire suppression agent, to a fully open setting, where a first orifice in that valve member allows the discharge of fire suppression agent therethrough to the second enclosure.

The method may comprise providing a manifold to collect and distribute fire suppression agent to an agent discharge line for each enclosure, and regulating the pressure within the manifold to provide a high rate discharge or a low rate discharge in a given enclosure (i.e. when the valve member is at a fully open setting). The method may also include determining a size for the second orifice which can produce a level of discharge of fire suppression agent when it is subjected to a high-rate-discharge pressure that corresponds to a low rate discharge when using the first orifice under a low-rate-discharge pressure.

The method may comprise activation of a manual control in a cockpit to open the directional valves.

The directional valve for the first enclosure may be moved to a restricted opening setting in the case where there is a loss of power to the fire suppression system. In this way it may provide a failsafe mechanism. For example, in the case that the aircraft loses power, the restricted setting allows a slow bleed for fire suppression agent to an enclosure with a fire hazard detected, which ensures long-lasting effects and thus time to land the aircraft or provide an emergency evacuation. This may be more beneficial than having a sudden high rate discharge, followed by no subsequent supply of fire suppression agent.

BRIEF DESCRIPTION OF THE DRAWINGS

Various embodiments of the disclosure will now be described with reference to the following description and drawings by way of example only, and with reference to certain figures, wherein:

FIG. 2 shows a schematic diagram of an exemplary valve member for a directional valve; and FIG. 3 shows a graph of an exemplary mass flow rate of fire suppression agent over time in order to suppress a fire, from the moment of initial activation, during cruising at altitude and descent till arrival at ground level of the aircraft.

DETAILED DESCRIPTION

Figure 1:
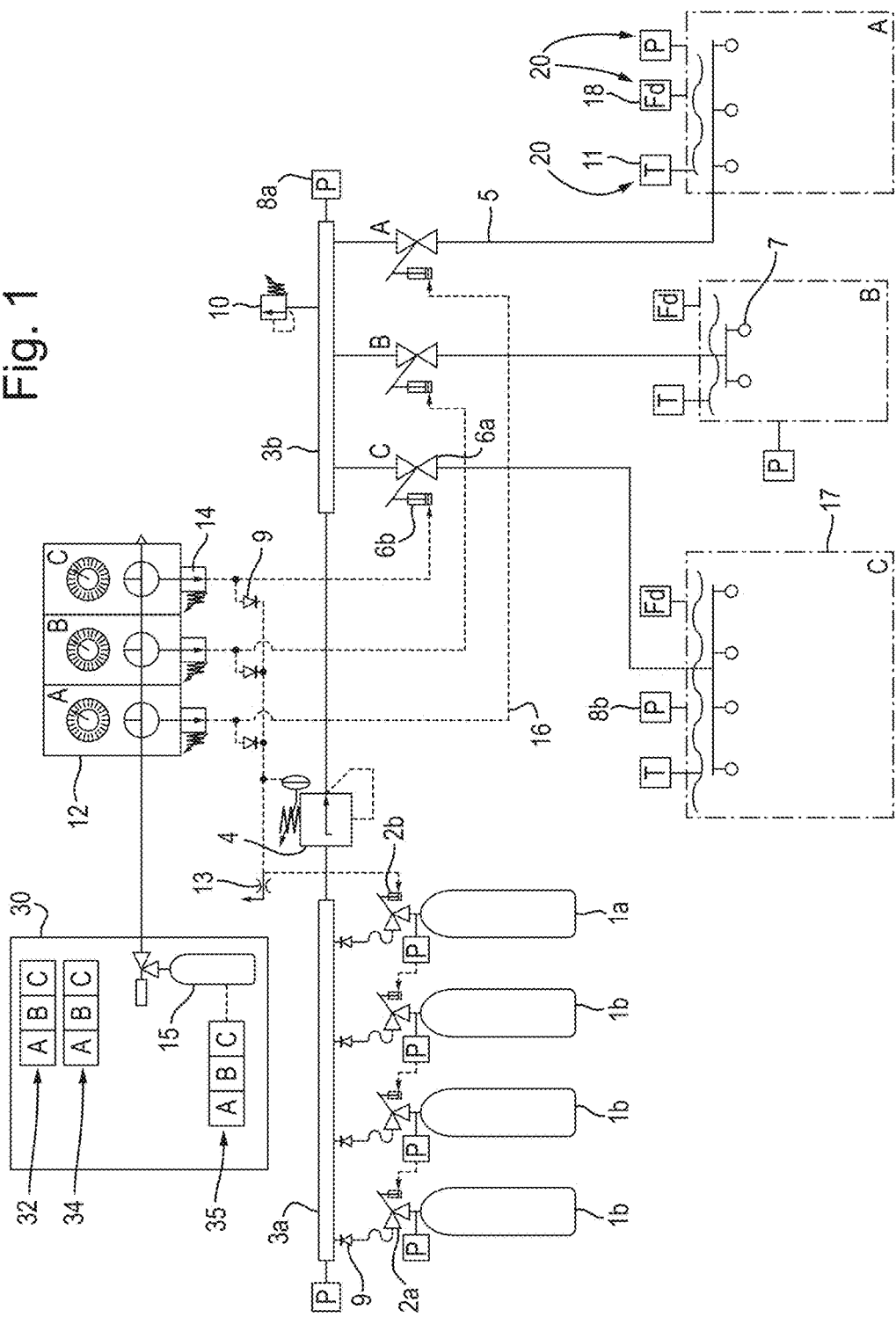
FIG. 1 shows a schematic diagram of an aircraft having an exemplary fire suppression control system for a plurality of enclosures.

An aircraft with a fire suppression control system comprises multiple enclosures 17, A, B, C. These enclosures 17 may include, but are not limited to, cargo bays, passenger enclosures, fuel tanks, an auxiliary power unit and an electronics bay.

Each enclosure 17 comprises a plurality of sensors 20. The sensors 20 may be for measuring temperature 11 or pressure 8b or may comprise a fire detection system 18. The fire detection system 18 may comprise sensors, including sensors for measuring temperature, pressure, the amount of smoke present in the enclosure 17, the oxygen concentration in the air in the enclosure 17, the concentration of combustion products in the air in the enclosure 17, UV sensors, light sensors and the like. Each of the temperature sensors 11, pressure sensors 8b and/or fire detection systems 18 transmits data to a control unit 12.

The control unit 12 comprises a processor and a memory, for monitoring and storing the data from the sensors 20. The memory further comprises pre-set data for comparison against the data received from the sensors 20, in order to recognise if a fire has broken out, or is likely to break out in any of the enclosures 17.

The fire suppression system further includes a plurality of high pressure bottles 1a, 1b containing fire suppression agent. Each of the bottles 1a, 1b is connected, via a high pressure collector manifold 3a to a discharge pressure regulator 4, which may be in the form of a control valve. The discharge regulator 4 is further connected to a low pressure distributor manifold 3b.

The discharge pressure regulator 4 is operatively connected to the control unit 12 and configured to receive signals from the control unit 12.

Stemming from the low pressure distributor manifold 3b is a discharge network 5, comprising multiple branches. At least one respective branch connects the low pressure distributor manifold 3b to each enclosure 17. On each branch of the discharge network 5, between the low pressure distributor manifold 3b and the respective enclosures 17, there is located a respective directional valve 6a, configured to divert a flow of fire suppression agent from the low pressure distributor manifold 3b to the respective enclosure 17.

Each directional valve comprises multiple valve settings, one of which can be selected for each directional valve at any one time. The valve settings comprise a closed setting 40, a fully open setting 42 and a restricted setting 44. In some instances, the directional valves may comprise a third or further setting where the flow through the valve is restricted.

Each enclosure 17 may further comprise a number of discharge nozzles 7 for discharging fire suppression agent. The discharge nozzles for each enclosure 17 are connected to the respective branch of discharge network 5. The size and arrangement of the nozzle orifices determines the velocity and distribution of the fire suppression agent into the enclosure 17.

The low pressure distributor manifold 3b may also be connected to an over pressure relief valve 10. The over pressure relief valve 10 acts to ensure egress of excess fire suppression agent should the pressure in the manifold 3b exceed a certain threshold pressure. The pressure in the manifold 3b may be determined from a system pressure transducer 8a, which monitors the status of the pressure of the fire suppression agent.

The system operates in the following manner. The sensors 20 measure data in each enclosure 17. All of this data is transmitted to the control unit 12. In the control unit 12, the processor compares the values of the data against the pre-set data thresholds stored on the memory. If the data exceeds the respective thresholds, it is likely that a fire has broken out. The control unit 12 thus sends a warning signal 32, 34 to the cockpit 30.

Further, the control unit 12 adjusts the valve setting to the fully open setting 42 for the directional valve. In the cockpit 30, the pilot, co-pilot or other member of staff will activate a manual control 35. In doing so, the directional valve 6a will then be opened.

The control unit 12 controls the rate of flow of fire suppression agent from the bottles 1a and 1b into the high pressure collector manifold 3a and via the discharge pressure regulator 4, such that there is sufficient fire suppression agent to flow through the discharge network 5 to the enclosure 17 in the form of a high rate discharge.

As can be seen in FIG. 3, the mass flow rate of the initial high rate discharge can be more than 10 times that of the minimum low rate discharge. The increased hazard discharge rate may be three, four, five or more times greater than the minimum low rate discharge and the descent discharge rate may be two, three, four or more times greater than the minimum low rate discharge.

Throughout the initial high rate discharge and thereafter, the sensors 20 continue to transmit data to the control unit 12, which continues to monitor and compare the data with pre-set values stored on the memory. In accordance with the data collected by the sensors 20 in the enclosure 17, the control unit 12 varies the quantity of suppression agent which is released by the discharge pressure regulator 4 to the low pressure distributor manifold 3b, thereby altering the pressure in the low pressure distributor manifold 3b in accordance with the predetermined high/low discharge rates to ensure efficiency of supply.

If the data measured and transmitted to the control unit 12 by sensors 20 leads to a further fire hazard detection, then again, a warning will be sent to the warning system 32, 34 in the cockpit 30. As before, the pilot or other member of staff in the cockpit 30 will activate the manual control 35 which will then open the directional valve 6a and allow an initial high rate of fire suppression agent to be released into the enclosure 17.

The release of fire suppression agent in each of the enclosures 17 with a fire detected is strictly controlled by the control unit 12. This is because a relatively high rate of release is necessary for the new fire, but a slow release is required for the old fire. This is achieved by the directional valve 6a having a number of valve settings.

The first setting is a "closed" setting 40, during which the directional valve 6a may be locked or unlocked, i.e. before fire detection or at least, before the pilot has manually activated the control 35 to open the directional valve 6a.

The second setting is a "fully open" setting 42, for discharge of fire suppression agent to the relevant enclosure 17. When only one enclosure 17 has a fire hazard detected, this setting will be selected, and may remain in place after the initial high-rate flow of fire suppression agent into the enclosure 17 if the pressure in the low pressure distributor manifold 3b is controlled by the discharge pressure regulator 4.

The third setting is a "restricted flow" setting 44. This is useful firstly as a failsafe mechanism, where there may be a limited fire suppression agent supply and a length of time which it must last. Thus the restricted flow setting 44 allows a continuous slow bleed of fire suppression agent into the enclosure, e.g. in the event of a loss of power to the fire suppression system after an initial activation.

The second use of this setting is in the case that a fire is detected in a second enclosure 17, e.g. after the first fire has been subdued and the fire suppression agent is being regulated at a pressure for a low rate discharge. If both the first enclosure 17 with the already-subdued fire and the second enclosure 17 with the new fire have their respective directional valves 6a at the fully open setting 42, then raising the pressure in the distributor manifold 3b again, to provide a high rate discharge for the second enclosure will mean that a substantial amount of fire suppression agent will be wasted on the already-subdued fire, which does not require so much fire suppression agent.

The solution is to switch to the restricted-flow valve setting 44 for the directional valve 6a of the already-subdued fire. This will direct the path of more of the fire suppression agent through the fully-open 42 directional valve 6a and into the enclosure 17 with the new fire.

The restricted valve setting 44 in the directional valve 6a can also be used to continuously bleed in fire suppression agent without the excessive loss of fire suppression agent.

The benefits of being efficient in not wasting fire suppression agent are significant. By being more efficient with the fire suppression agent, less fire suppression agent needs to be carried on board the aircraft and thus, weight, space and fuel savings are made compared to earlier systems.

Also it means that a number of smaller enclosures such as e.g. an electronics bay, an APU compartment or a fuel tank can be connected to the same system as the cargo compartments, enhancing the redundancy of the initially mentioned enclosures. It further provides the opportunity to protect more than one enclosure with one fire suppression system, saving the weight of providing additional suppression systems.

Further, by being efficient with fire suppression agent, the large quantities of inert gas which might need to be carried can be reduced. This results in weight savings for the aircraft.

Moreover, fire suppression agent management on an aircraft is extremely important, since if the aircraft runs out of agent part-way through a flight, then the fire may restart with no means of prevention remaining. Thus by rationing the fire suppression agent in this economic way, a greater safety of the aircraft is ensured.

In some embodiments, the control unit 12 may be electric; in others, it may be electronic, hydraulic, pneumatic or mechanical.

In the case of a pneumatic system, the fire suppression system may also comprise a pilot pressure bottle 15 with an associated valve, a pilot regulator 14, a pilot pressure network 16 and check valves 9. The pilot pressure bottle 15 comprises a high pressure source which provides stored energy. The associated valve is the manual control 35 which is activated by the pilot or other member of staff in the cockpit 30 when an alert is received in the cockpit 30.

When the pilot activates the manual control 35, the pressure is released from the pilot pressure bottle 15 to a pilot pressure network 16. The pressurised fluid flows via a pilot regulator 14 for each respective enclosure 17 and acts to unlock the directional valve 6a associated with a fire event. Fluid from the pilot pressure bottle 15 also flows via check valves 9 to the bottles 1a, 1b, prompting a bottle 1a, 1b to be opened. The fluid further flows via discharge pressure regulator 4 for control of the discharge of the fire suppression agent to the low pressure distributor manifold 3b and thus to the enclosure 17 in which a fire has occurred.

The pneumatic system may further comprise a vent exhaust 13 for venting the pneumatic fluid from the system in the case of over-pressurisation.

The present disclosure can be further modified, as will be understood by one skilled in the art, within the scope of the present invention as defined in the claims.

The invention claimed is:

1. A fire suppression system for an aircraft having a plurality of enclosures, the fire suppression system comprising:
   a plurality of agent discharge lines, each extending to an enclosure of the plurality of enclosures; and
   a plurality of directional valves provided in the plurality of agent discharge lines for controlling the discharge of fire suppression agent to each enclosure of the plurality of enclosures, each directional valve comprising a valve member for controlling the discharge of fire suppression agent, wherein the valve member comprises:
   a blocking portion to provide a closed setting for the fire suppression agent;
   a first orifice to provide a fully open setting for the fire suppression agent; and
   a second orifice to provide a restricted opening setting in which flow of fire suppression agent is restricted,
   wherein the valve member is configured so that during opening of the directional valve from a closed setting, the first orifice follows the blocking portion and precedes the second orifice in order to provide a fully open setting followed by a restricted opening setting;

one or more sensors configured to detect presence, and subsequent extinguishing or sufficient subduing, of a first fire in a first enclosure of the plurality of enclosures; and a control unit configured so that if the first fire in the first enclosure of the plurality of enclosures is detected, the control unit regulates the pressure of the fire suppression agent reaching the plurality of directional valves so that a high rate discharge of the fire suppression agent is provided to the first enclosure initially, followed by a low rate discharge of the first suppression agent once the one or more sensors indicate that the first fire is extinguished or sufficiently subdued;

wherein the second orifice of each directional valve of the plurality of directional valves is sized to produce a level of discharge of the fire suppression agent when subjected to a high-rate-discharge pressure that corresponds to using the first orifice under a low-rate-discharge pressure; and wherein the control unit is configured so that if a second fire is detected in a second enclosure of the plurality of enclosures, and the first enclosure is being subjected to a low rate discharge of fire suppression agent, the control unit:

permits further actuation of the directional valve for the first enclosure to select the second orifice; and regulates the pressure of the fire suppression agent reaching the directional valves of the first enclosure and the second enclosure to a higher-rate-discharge pressure in order to produce a high rate discharge of fire suppression agent in the second enclosure while the discharge rate in the first enclosure is restricted by the second orifice of the directional valve for the first enclosure.

2. A fire suppression system as claimed in claim 1, wherein each valve member comprises a plate or a rotational element, which has the blocking portion, the first orifice and the second orifice in a sequence corresponding to the different settings.

3. A fire suppression system as claimed in claim 1, wherein the control unit is arranged to send a warning signal to a cockpit, and wherein a manual control is provided in the cockpit to open the directional valve.

4. A fire suppression system as claimed in claim 1, wherein the system further comprises a manifold which is in fluid communication with the directional valves where fire suppression agent is collected from a plurality of fire suppression agent bottles and regulated to be at a high-rate-discharge pressure or a low-rate-discharge pressure before flowing into one or more selected enclosures with opened directional valves.

* * * * *